(12) United States Patent
Michaud

(10) Patent No.: US 7,938,615 B2
(45) Date of Patent: May 10, 2011

(54) ENHANCED VORTEX ENGINE

(75) Inventor: Louis Marc Michaud, Sarnia (CA)

(73) Assignee: Louis Michaud, Sarnia, ON (CA)

( * ) Notice: Subject to any disclaimer, the term of this patent is extended or adjusted under 35 U.S.C. 154(b) by 871 days.

(21) Appl. No.: 11/499,538

(22) Filed: Aug. 4, 2006

(65) Prior Publication Data
US 2011/0052369 A1    Mar. 3, 2011

Related U.S. Application Data

(63) Continuation-in-part of application No. 10/471,672, filed on Sep. 11, 2003, now Pat. No. 7,086,823.

(51) Int. Cl.
*F03D 7/06* (2006.01)
(52) U.S. Cl. ............... 415/4.2; 415/4.4; 415/909
(58) Field of Classification Search ............ 415/2.1, 415/4.2, 4.4, 160, 907, 909
See application file for complete search history.

(56) References Cited

U.S. PATENT DOCUMENTS

| | | |
|---|---|---|
| 3,743,257 A | 7/1973 | Fordyce |
| 3,936,652 A * | 2/1976 | Levine .................. 290/2 |
| 4,018,543 A | 4/1977 | Carson |
| 4,070,131 A | 1/1978 | Yen |
| 4,080,186 A | 3/1978 | Ockert |
| 4,157,368 A | 6/1979 | Fernandes |
| 4,164,256 A | 8/1979 | Kelp |
| 4,275,309 A | 6/1981 | Lucier |
| 4,391,099 A | 7/1983 | Sorensen |
| 4,397,793 A | 8/1983 | Stillman et al. |
| 4,452,046 A * | 6/1984 | Valentin ............ 60/641.11 |
| 4,499,034 A | 2/1985 | McAllister, Jr. |
| 5,483,798 A | 1/1996 | Prueitt |
| 6,772,593 B2 | 8/2004 | Dunn |

FOREIGN PATENT DOCUMENTS

| | | |
|---|---|---|
| AU | 6 562 801 A | 3/2002 |
| CA | 2 460 564 | 3/2006 |
| FR | 1 439 849 | 5/1966 |
| FR | 2 588 317 A1 | 4/1987 |
| GB | 1 231 582 A | 5/1971 |
| GB | 2 261 705 A | 5/1993 |
| GB | 2 302 139 A | 1/1997 |

(Continued)

OTHER PUBLICATIONS

Michaud, L.M., Proposal for the use of a controlled tornado-like vortex to capture the mechanical energy produced in the atmosphere from solar energy. BAMS 1975, vol. 56, 536.

(Continued)

*Primary Examiner* — Edward Look
*Assistant Examiner* — Dwayne J White

(57) ABSTRACT

The invention covers improvements to the Atmospheric Vortex Engine. A tornado-like convective vortex is produced by admitting air at the base of a cylindrical wall via tangential entry ducts. The heat required to sustain the vortex is provided in peripheral heat exchange means located outside the cylindrical wall. The heat source for the peripheral exchange means can be waste industrial heat or warm sea water. The preferred heat exchange means is a cross-flow wet cooling tower. The mechanical energy is produced in a plurality of turbines. The air can enter an arena via tangential entries or via an opening at the center of the arena floor. The invention can be used to produce mechanical energy, to reduce the temperature of cooled water or to produce precipitation. The invention includes a circular forced draft cooling tower that can operate in non-vortex mode or in vortex mode.

8 Claims, 10 Drawing Sheets

FOREIGN PATENT DOCUMENTS

| | | |
|---|---|---|
| JP | 57 206 781 A | 12/1982 |
| WO | WO 95 16858 A | 6/1995 |
| WO | WO 00 42320 A | 7/2000 |

OTHER PUBLICATIONS

Michaud, L.M., Entrainment and Detrainment required to explain updraft properties and work dissipation. Tellus 1978, vol. 50A, pp. 241-251.

Michaud, L.M., Vortex process for capturing mechanical energy during upward heat convection in the atmosphere. Applied Energy, 1999, vol. 62/4, pp. 241-251.

Michaud, L.M., Thermodynamic cylce of the atmospheric upward heat convection process. Meteorology and Atmospheric Physics, 2000, vol. 72, pp. 29-46.

Michaud, L.M., Total energy equation method for calculating hurricane intensity. Meteorology and Atmospheric Physics, 2001, vol. 78, issue 1/2 pp. 35-43.

Byram, G.M. and Martin, R.E., Fire whirls in the laboratory, Fire Control Notes, 1962, US Fire Service.

Mullett, L.B., The solar chimney overall efficiency, design and performance. International journal of Ambient Energy, 1987, vol. 8(1), pp. 35-40.

Michaud, L. M. Vortex Engine web site. http://vortexengine.ca/ Above publications by L. Michaud are available on this web site.

Marley Cooling Tower Publications http://www.marleyct.com/publications.asp Cooling tower Glossary http://www.cti.org/whatis/glossary.shtml.

Solar Updraft Tower http://www.sbp.de/en/fla/contact/downloadfThe_Solar_Updraft.pdf.

* cited by examiner

ENHANCED VORTEX ENGINE

CROSS REFERENCE TO RELATED APPLICATION

This specification is a Continuation-in-Part of U.S. patent application Ser. No. 10/471,672, filed Sep. 11, 2003, now issued U.S. Pat. No. 7,086,823.

FIELD OF INVENTION

The invention relates to the electrical energy industry and captures energy produced when heat is carried upward by convection in the atmosphere. The invention relates to renewable energy specifically to the solar chimney. The invention relates to the waste heat disposal industry specifically to the cooling tower and the fin-fan cooler industry. The invention relates to the field of meteorology and involves the production of a vortex similar to a natural tornado. The invention can produce precipitation and alleviate global warming.

BACKGROUND OF THE INVENTION

Review of Prior Art

Over half of the thermal energy input to a power plant is rejected as low temperature waste heat. Waste heat disposal is a costly part of the power production. Cooling options include once-through heat rejection to water body, and recirculating heat rejection to the atmosphere. Once-through cooling is only practical where a large water body is available and when returning warm water is not environmentally objectionable. Cooling towers and fin-fan coolers are commonly used to dispose of waste heat in the atmosphere. The most common device for transferring waste heat to the atmosphere is the wet cooling tower. There are two main types of wet cooling towers: natural draft cooling towers and mechanical draft cooling towers. Natural draft cooling towers are among the largest structures built and have a very high capital cost. Natural draft cooling towers can be 200 m high. Mechanical draft cooling towers are less expensive than natural draft cooling towers but require fans to circulate the air through falling water and electrical power to drive fans. Up to 1% of the electrical power produced in the power plant can be consumed in driving the cooling tower fans. The invention replaces the physical stack of the natural draft cooling tower with a vortex eliminating both the hyperbolic stack and the need for fan power.

A solar chimney is a solar engine that captures the energy produced during upward heat convection. A solar chimney requires a very high physical chimney surrounded by a very large area of solar collector. The present invention replaces the physical chimney with a vortex and eliminates the need for the solar collector by using waste industrial heat, warm humid air or warm sea water as its heat source.

OBJECTS AND ADVANTAGES

The vortex engine is a major improvement on conventional waste heat disposal systems. The invention could be used to replace conventional cooling towers with superior devices. The invention increases the output of thermal power plants by capturing the mechanical energy produced when waste heat is carried upward in the atmosphere. In addition, the invention increases the output of thermal power plants by reducing cooled water temperature. The invention could be used to produce precipitation, to reduce surface temperature, to reduce instability and severity of storm, to reduce pollution by washing or lifting surface air, or to alleviate global warming by expediting upward heat transport and by reducing fossil fuel consumption.

The invention produces its maximum power during periods of high insolation and low wind. Its peak power production period corresponds to periods of high electrical load and to periods of low wind when conventional wind power is unavailable. Wet cooling towers are large water consumers because the cooling results from evaporating a small fraction of the water circulating in the cooling tower. Lack of water is forcing some thermal power plants to use less efficient and more costly dry cooling tower. With conventional wet cooling towers, the upward heat convection and associated precipitation occurs well away from the cooling tower and does not contribute to the local rainfall. A vortex cooling tower could produce precipitation in the local watershed thereby making up for the water evaporated in the cooling tower.

SUMMARY

An Atmospheric Vortex Engine uses a tornado-like vortex to capture the mechanical energy produced when heat is carried upward by convection in the atmosphere. The vortex is produced by admitting air tangentially in the base of a vertical axis cylindrical wall. The volume within the cylindrical wall wherein the vortex forms is called the "arena". The air entering the arena can have natural heat content, can be heated in a peripheral heat exchanger located upstream of the tangential entries and outside the cylindrical wall, or can be heated by solar radiation in a solar collector surrounding the cylindrical wall. The heat source for the peripheral heat exchanger can be waste industrial heat or warm sea water. The vortex can be started using a variety of devices including: heating the air in the arena with fuel or steam, using steam jets to entrain air in the tangential entries while at the same time increasing the temperature and vapor content of the air, or by pushing air in the arena via the tangential entries with forced draft fans. Once the vortex has been established, the starting device can be turned off. The mechanical energy is captured with turbo-generators located upstream of the tangential entries. The invention turns costly to dispose of waste heat into an energy producing asset.

a) Cooling Towers

The heat exchanger can be any of the many heat exchanger types used in industry. The preferred heat exchange means is a cross-flow wet cooling tower. Alternate types of heat exchangers could include: other types of wet cooling towers, dry cooling towers, finned tubes process coolers and direct steam condensers. The invention can incorporate any of the prior cooling tower industry inventions. Known features of cooling towers are therefore not detailed in this specification. Given the heat duty the cooling industry is able to design an appropriate cooling tower.

The normal purpose of cooling towers is to reduce the temperature of water or other fluids. The process fluid, usually water, is cooled by transferring heat from the process fluid to the atmosphere. Cooling towers are heat exchangers which simultaneously reduce the heat content of the fluid to be cooled and increase the heat content of air. The heat exchanger transfers enthalpy from water to air; the enthalpy decrease of the water is equal to the enthalpy increase of the air. A cooling tower is both a water cooler and an air heater-humidifier. In the cooling tower industry, the primary purpose of a cooling tower is to cool the process fluid. In the atmospheric vortex engine, the primary purpose of the cooling tower is to heat the air. The term "cooling tower" is retained because it is widely used in industry. This specification uses standard cooling tower terminology where applicable. A "cooling cell" is the smallest subdivision of a cooling tower which can function as an independent unit with regard to air and water flow. A "cooling cell" includes: cell fill, drift eliminators, louvers, warm and cold water basins, and associated fan. A "vortex engine sector" is a cooling cell and associated equipment not located within the cooling cell such as: turbo-generator, tangential entry duct, and associated flow restrictors.

Alternately the device for heating the air can be a solar heat collector covered with a transparent roof similar to the solar collector of solar chimney. The solar heat collector would surround the cylindrical wall. Ambient air would enter the open outer rim of the solar collector. Heated air would leave the inner rim of the solar collector and enter the cylindrical wall via tangential entries. The cylindrical wall of the vortex engine would protect the solar collector from damage by the vortex. Alternatively the solar collector could be solar ponds from which solar heated water would be pumped to cooling cells to transfer heat form water to air.

b) Expanders

Devices within which a gas is expanded to produce work are generically known as expanders. Expander types include: turbines, and positive displacement pistons. Turbines can have axial or radial flow. Axial flow turbines are the more common type. Given air flow and differential pressure the expander industry is able to design an appropriate expander. The turbo-generators can incorporate any prior turbo-generator industry inventions. The terms expander, turbo-expander, expansion turbine and turbine will be used interchangeably. A turbo-generator is a turbine with an attached generator. An ideal expander has an efficiency of 100% and its outlet entropy equals its inlet entropy. Real expanders have efficiency of 80% to 90% and outlet entropy slightly higher than inlet entropy. Efficiency reduction is associated with entropy increase.

The preferred expander is an axial turbine. There are two types of axial turbines:

Turbines with inlet nozzles and with fixed pitch rotating blades similar to the last few stages of the expander part of a gas-turbine. In a vortex engine, the compressor part of the gas-turbine is not required. The air flow is controlled by covering and uncovering fixed inlet nozzles. The expander does not have to withstand the high temperatures encountered in gas-turbines. Turbines with inlet nozzles could be the preferred expander at turbine differential pressure above approximately 1 kPa. More than one stage may be appropriate at turbine differential pressure over 5 kPa.

Turbines without inlet nozzles and with variable pitch blades similar to helicopter rotors. There are no inlet nozzles and the air flow is controlled by varying blade pitch and electrical load. Turbines without inlet nozzles could be the preferred at differential pressure under approximately 1 kPa.

Both turbines with and without inlet nozzles have significantly higher differential than conventional wind turbines. The mechanical energy produced per unit area of rotor blade increases with differential pressure. The diameter of a vortex engine turbine with a given mechanical energy rating is much smaller than the diameter of conventional wind turbine of the same rating. Turbines without inlet nozzles can be made to act as fans by using the generator as a motor. Turbines with inlet nozzles cannot be used as fans. The forced draft fan used to start the vortex could become a turbine once the vortex is established.

Enhancements covered by this continuation specification are described in a new elements section following the presentation and description of the new drawings.

BRIEF DESCRIPTION OF THE DRAWINGS

Parent Specification U.S. Pat. No. 7,086,823 uses figure numbers 1 to 6. This Continuation-in-Part Specification uses figure numbers starting at 7. A better understanding of the present invention can be obtained when the following detailed description of the preferred embodiment is considered in conjunction with the following drawings, in which.

Figure 7:
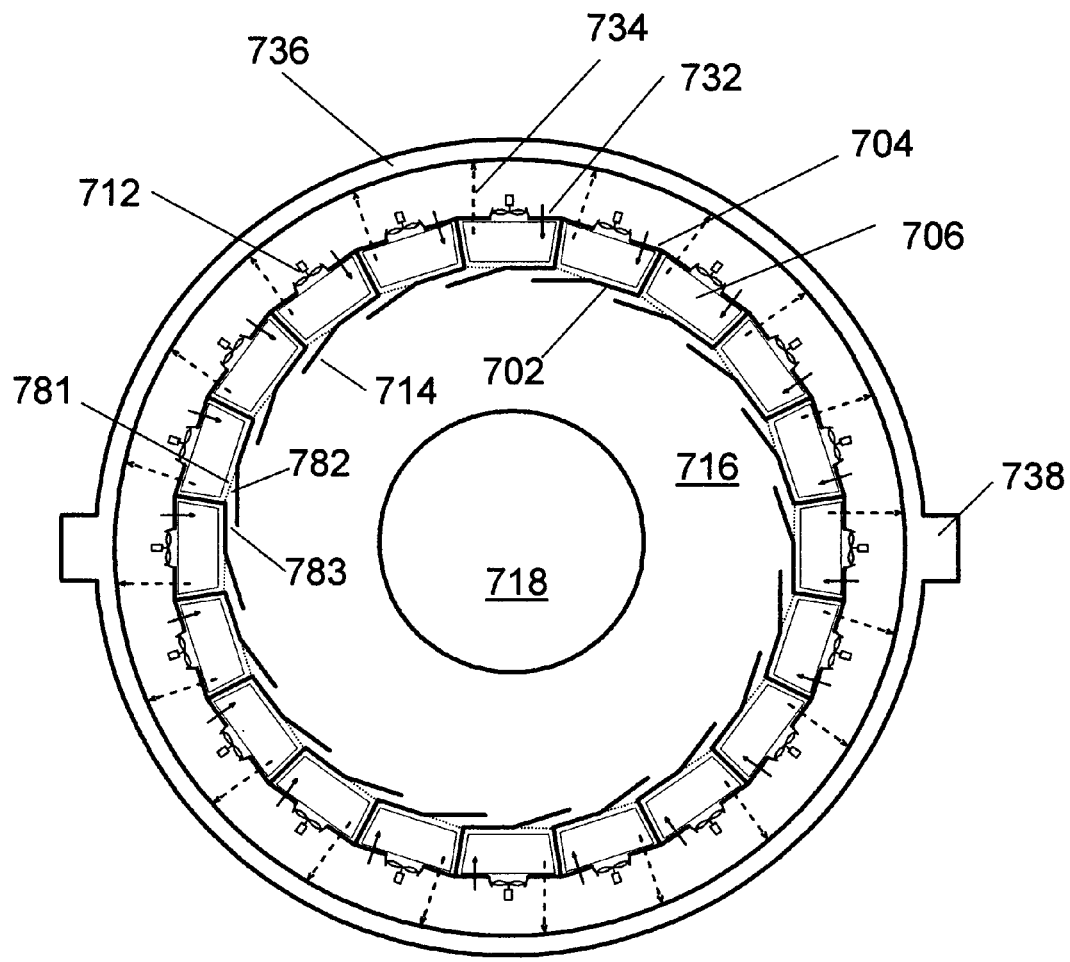
FIG. 7 is a plan view of vortex engine with an uninterrupted front face and a circular cooled water channel.
Figure 8:
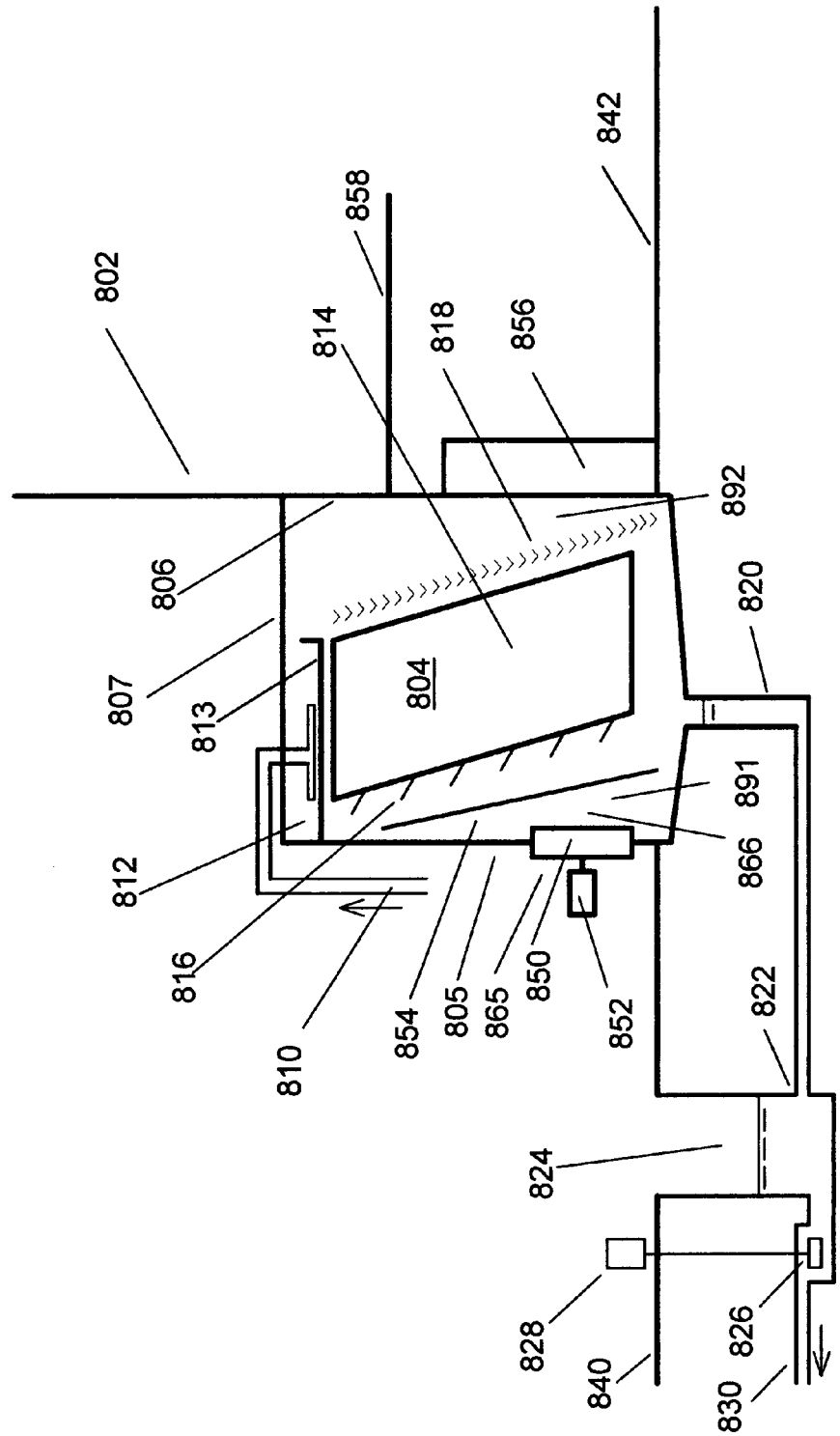
FIG. 8 is a cross-section through a cooling cell/heat exchanger.

| Drawing Reference Numeral - FIGS. 7 and 8 | |
|---|---|
| 401 Heat exchanger | 423 Reverse circulation air entry |
| 403 Arena floor | 426 Steam jet |
| 404 Arena | 431 Underground airways for intermediate radius floor tangential air entry (with steam injector) |
| 405 Cylindrical wall | 432 Airway curved exit |
| 406 Inter annular ring air entry | 433 Airway steam injector |
| 407 Warm water inlet | 434 Underground airways for |
| 408 Cooled water outlet | 435 Underground air tunnel |
| 411 Turbo-generator (outlet to cooling cell) | 441 Circular underground room |
| 412 Forced draft fan (optional) | 442 Circular room roof |
| 415 Turbo-generator (optional) (outlet to tangential entry duct) | 445 Circular room roof opening |
| 421 Linear tangential entry duct | 451 Convergence roof |
| 422 Tangential entry duct restrictor | 452 Annular ring |
| 425 Tangential entry duct straightening vanes | 455 Convergence roof circular opening |
| 461 Cylindrical wall lower end | 482 Tangential entry duct air inlet |
| 462 Cylindrical wall upper end | 483 Tangential entry duct air outlet |
| 463 Cylindrical wall upper end opening | 487 Tangential entry duct inner wall |
| 467 Turbine | 488 Tangential entry duct outer wall |
| 468 Generator | 491 Heat exchanger air inlet |
| 481 Cylindrical wall lower end air opening | 492 Heat exchanger air outlet |

Figure 9:
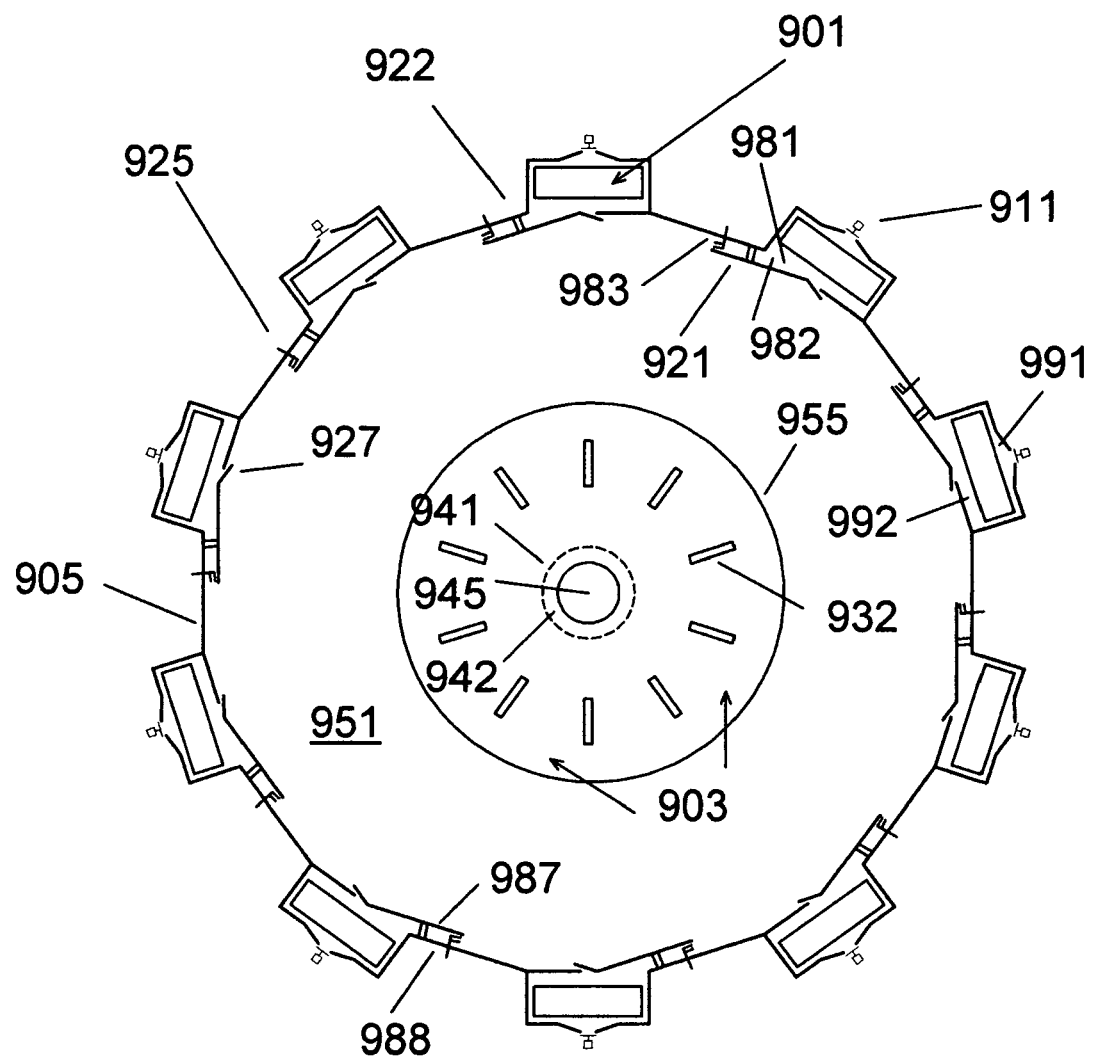
FIG. 9 is a plan view of vortex engine with elevated floor.
Figure 10:
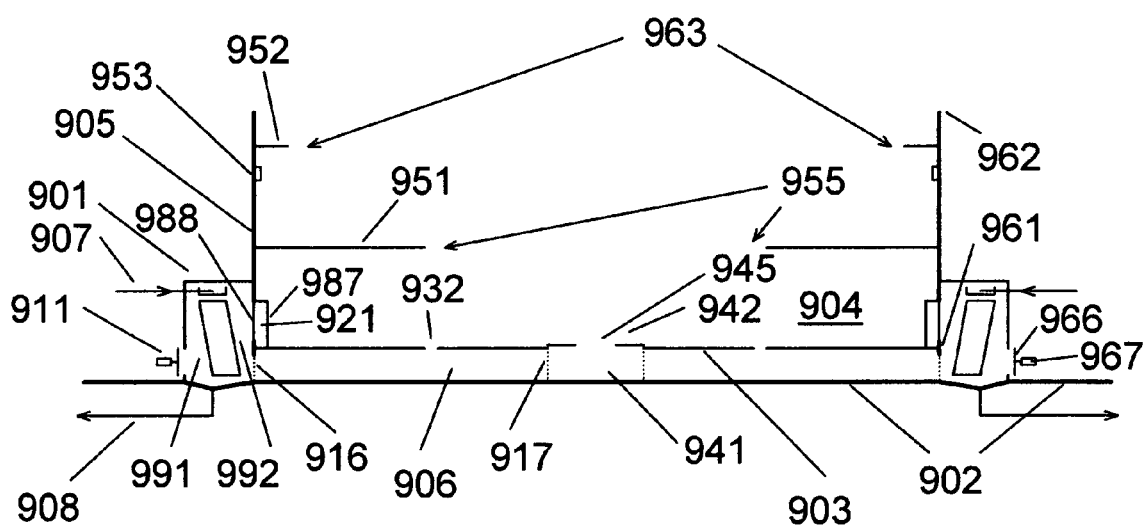
FIG. 10 is a cross-sectional view of a vortex engine with elevated floor.

| Drawing Reference Numeral - FIGS. 9 and 10 | |
|---|---|
| 301 Heat exchanger | 342 Convergence roof opening |
| 304 Arena | 346 Stack |
| 305 Cylindrical wall | 350 Cooled water basin |
| 325 Radial air entry | 351 Pump sump |
| 326 Forced draft fan | 352 Cooled water equalizing pipes |

-continued

340 Convergence roof

Drawing Reference Numeral - FIGS. 11 and 12

| | |
|---|---|
| 501 Heat exchanger | 540 Convergence roof |
| 505 Cylindrical wall | 541 Convergence roof opening |
| 521 Linear tangential entry air duct | 550 Cooled water basin |
| 525 Radial or reversed rotation air-entry | 551 Pump sump |
| 526 Forced draft fan or Turbo-generator | 552 Water equalizing line |

Drawing Reference Numeral - FIG. 13

| | |
|---|---|
| 702 Cylindrical wall | 716 Convergence roof |
| 704 Cooling tower uninterrupted front | 718 Convergence roof opening |
| 706 Heat exchanger | 732 Warm water Inlet pipe |
| 712 Turbo-generator | 734 Underground cooled water pipe |
| 714 Linear tangential entry duct | 736 Circular cooled water channel |
| | 738 Cooled water pump sump |
| 781 Cylindrical wall lower end opening | |
| 782 Tangential entry duct air inlet | 783 Tangential entry duct air outlet |

Drawing Reference Numeral - FIG. 14

| | |
|---|---|
| 802 Cylindrical wall | 822 Cooled water seal |
| 804 Heat exchanger | 824 Circular cooled water channel |
| 805 Cooling cell air inlet wall | 826 Cooled water pump |
| 806 Cooling air outlet wall | 828 Pump motor |
| 807 Cooling cell sub-atmospheric enclosure | 830 Cooled water pipe |
| 810 Warm water inlet pipe | 840 Outside grade |
| 812 Warm water distributor tray | 842 Arena floor |
| 813 Cross-flow nozzles | 850 Turbine |
| 814 Cooling tower fill | 852 Generator |
| 816 Louvers | 854 Baffle |
| 818 Drift eliminators | 856 Linear tangential entry duct |
| 820 Cooled water drain pipe | 858 Convergence roof |
| 865 Turbine air inlet | 866 Turbine air outlet |
| 891 Heat exchanger air inlet | 892 Heat exchanger air outlet |

Drawing Reference Numeral - FIGS. 15 and 16

| | |
|---|---|
| 901 Heat exchanger | 921 Linear tangential entry duct |
| 902 Grade level base | 925 Steam jet |
| 903 Elevated floor | 932 Intermediate radius floor tangential air entry |
| 904 Arena | 941 Circular central room |
| 905 Cylindrical wall | 942 Circular room roof |
| 906 Under floor plenum | 945 Circular room roof opening |
| 907 Warm water inlet | 951 Convergence roof |
| 908 Cooled water outlet | 952 Annular ring |
| 911 Turbo-generator | 953 Inter ring air entry |
| 916 Under floor air entry restrictor | 955 Convergence roof opening |
| 917 Circular room entry peripheral wall or deflector ring | |
| 961 Cylindrical wall lower end | 982 Tangential entry duct air inlet |
| 962 Cylindrical wall upper end | 983 Tangential entry duct air outlet |
| 963 Cylindrical wall upper end opening | 987 Tangential entry duct inner wall |
| 966 Turbine | 988 Tangential entry duct outer wall |
| 967 Generator | 991 Heat exchanger air inlet |
| 981 Cylindrical wall lower end opening | 992 Heat exchanger air outlet |

DESCRIPTION

Figure 1:
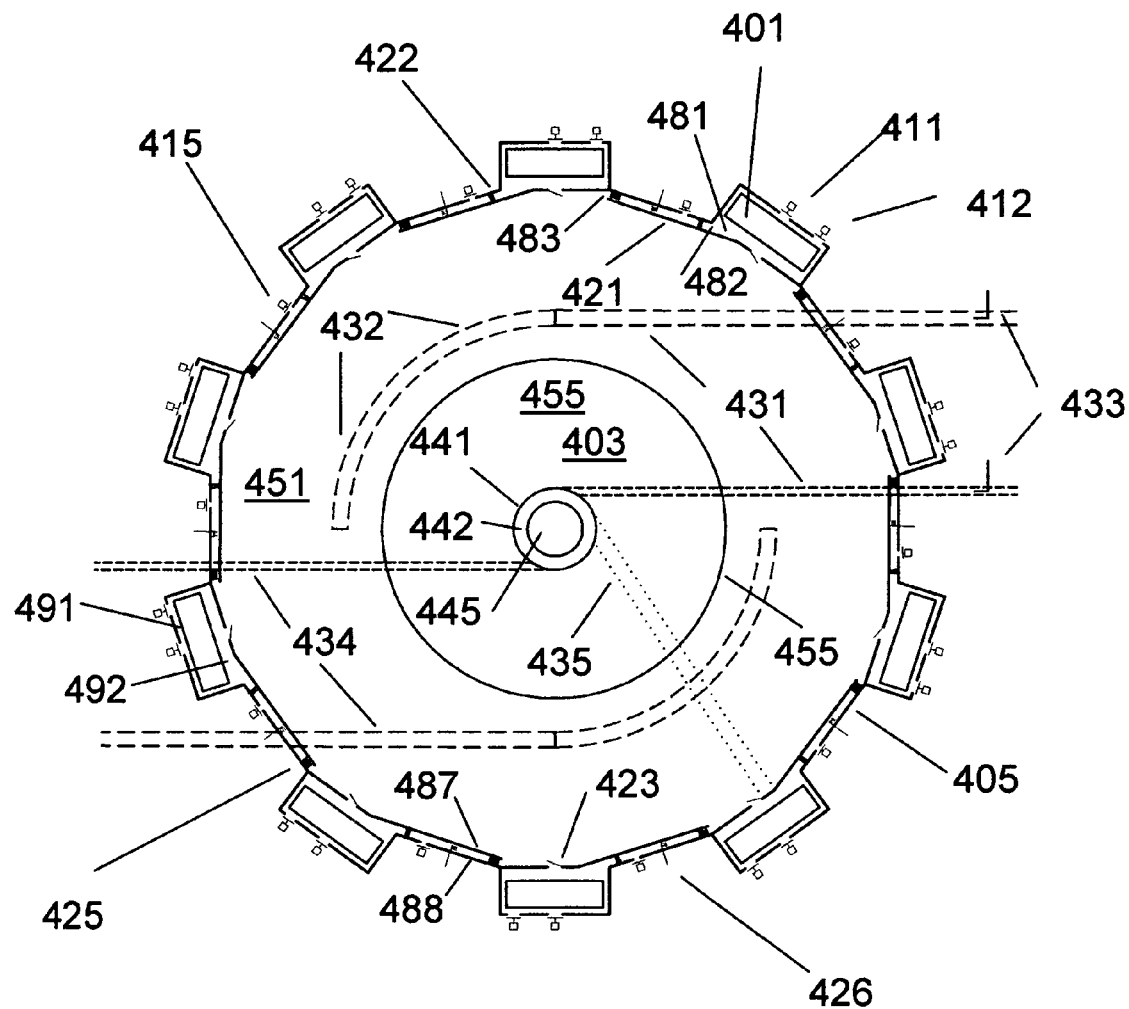
FIG. 1 is a plan view of atmospheric vortex engine with tangential entry ducts.
Figure 2:
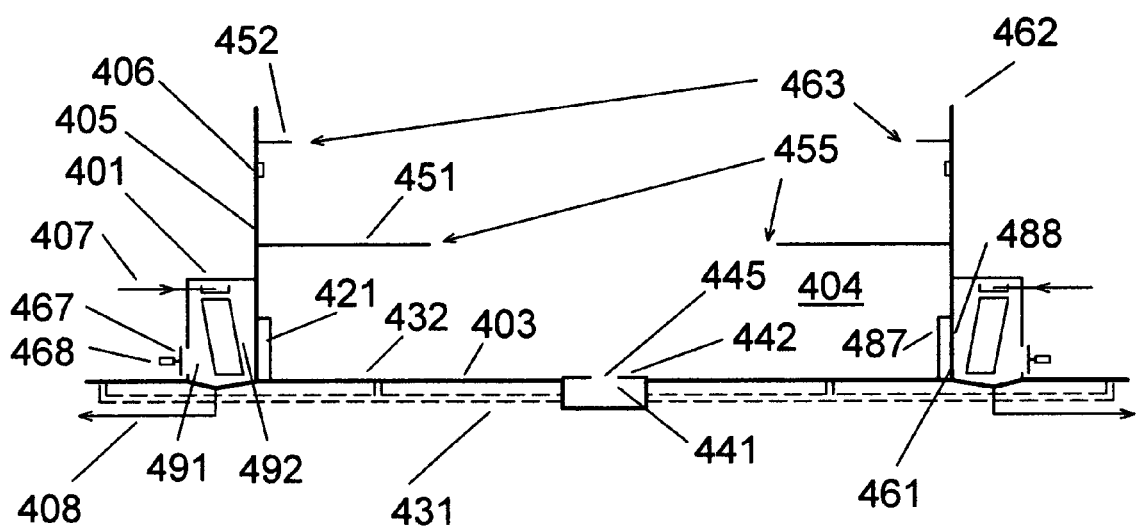
FIG. 2 is an elevation view of atmospheric vortex engine with tangential entry ducts.

FIGS. 1 and 2

FIGS. 1 and 2 show plan and elevation views of a large Atmospheric Vortex Engine with the main tangential entry ducts 421 located inside the cylindrical wall 405. Cylindrical wall 405 has a lower end 461, an upper end 462, a large upper end opening 463 and a plurality of air openings 481 at the lower end. The complete system is called the "station" while the volume within the cylindrical wall 405 is called the "arena" 404. The cylindrical wall is a regular 20 sided polygon. The heat exchangers 401 shown in the figure are one sided wet cross-flow cooling tower but other types of heat exchangers such as counter-flow cooling towers or finned tubes could be used. Each heat exchanger 401 has a linear tangential entry duct 421 into arena 404. Each tangential entry duct 421 has an air inlet 482 and an air outlet 483. Each tangential entry duct has an inner wall 487 and an outer wall 488. Each linear tangential entry duct 421 can have air inlet flow restrictor 422, entraining steam jet 426, and outlet straightening vanes 425. Each heat exchanger 401 has an air inlet 491 and an air outlet 492. Each heat exchanger 401 air outlet 492 is connected to the air inlet 482 of the tangential entry duct 421 via opening 481 in the lower end 461 of the cylindrical wall 405.

Each heat exchanger 401 has an inlet turbo-generator 411 and can have an inlet forced draft fan 412. Turbo-generator 411 comprises turbine 467 driving a generator 468. Additional turbo-generators 415 can discharge directly in the tangential entry duct 421 without going through the cooling cell 401. Injecting steam in the tangential entry duct 421 with steam jet 426 is the preferred method of starting the vortex. Alternative vortex starting devices include: forced draft fans 412 in cooling cell inlets, or heating the air in arena 404 with fuel or steam. Cooling cells 401 operate at sub-atmospheric pressure because the air outlet is connected to the base of the vortex via linear tangential entry duct 421 and because the pressure at the base of the vortex is less than ambient pressure. The layer of air next to arena floor 403 acts as a channel because friction reduces tangential velocity in this layer and there is no similar tangential velocity reduction at higher levels. There can be friction enhancing devices including friction flaps, surface roughness, or small protrusions on arena floor 403. There can be a hump like hump 85 in FIG. 4 of U.S. Pat. No. 7,086,823, in the center of arena floor 403 to help keep the base of the vortex in the center of arena 404. The air velocity in the cooling cell 401 is limited by restrictions that can be part of turbo-generator 411 at the cooling cell 401 inlets and by restrictors 422 in linear tangential entry duct 421 at cooling cell 401 outlets to prevent excessive velocity from damaging the cooling cell fill 814 of FIG. 8. Air velocity across the fill is limited to approximately 3 m/s.

Cylindrical wall 405 could be 200 m in diameter by 100 m high. The number of cooling cells, ten in FIG. 1, is reduced for clarity. A 200 m diameter atmospheric vortex engine could have forty cells and each cell could have a 5 MW turbo-generator 411 for a total electrical power production of 200 MW.

There is a convergence roof 451 with a central opening 455 over arena 404. There is a circular underground room 441 at the center of the station; the underground room has a roof 442 with an opening 445 which can be adjustable. Linear tangential entry duct 421 is the main air entry into the arena 404, reverse rotation air entries 423 can be used to bring air with reverse rotation in the arena 404. The circulation of the air within the arena can be reduced or reversed by closing restrictors 422 in main tangential air entries 421 and opening reverse direction air entries 423.

The air rotation in a vortex engine can be clockwise or counter-clockwise. The direction of the rotation produced by main tangential entries 421 is called direct rotation. The direction of the rotation produced by reversed air entries 423 is called indirect rotation. In the figures the direct rotation has been shown as counter-clockwise; indirect rotation is therefore clockwise. In the northern hemisphere counter-clockwise rotation is cyclonic and clockwise rotation is anti-cyclonic. Direct rotation in a vortex engine can be either cyclonic or anti-cyclonic; there may be advantages in using one direction over the other but either should work.

Underground airways 431 and 434 can be used to let air in through station floor 403 tangentially at reduced radii. Underground airway 431 and 434 can have curved ends 432 that rise gradually, or can enter the circular underground room 441 tangentially. Underground airways 431 with direct rotation are used to help establish the vortex and can have steam injectors. Underground airways with reverse rotation, not shown, are used to stop the vortex and do not have steam injectors. Ambient air or warm humid air from the cooling cell 401 can be routed to the underground circular room 441 via tunnel 435. Only one tunnel 435 is shown; there could be a plurality of tunnels. Tunnel 435 can enter the circular room 441 tangentially as shown or radially. When the floor is elevated, see FIG. 1, airways 431 and 434 and tunnel 435 do not need to be underground. The term "under-floor" herein, is used to designate passageways, partitions, components and the like located under the floor, whether the floor is elevated or not.

Heat exchanger 401 is a wet cross-flow tower cooling cell. A cooling cell is a type of heat exchanger. Heat exchanger 401 has a warm water inlet 407 and a cooled water outlet 408. Water flow is described in more detail in the description of FIG. 7 and FIG. 8.

Transition rings 452, only one of which shown for simplicity, inhibit ambient air entrainment downward along the inside of the cylindrical wall 405. Entrainment of non-rotating ambient air can reduce vortex rotation. Inter-ring air entry 406 in the transition zone between rings permits the introduction of air with appropriate tangential velocity. Inter-ring air entries 406 can have restrictors and steam injection.

Operation

FIGS. 1 and 2

A vortex engine can operate with one or more cooling sectors in service. The vortex engine would be started by establishing the vortex with only a few sectors in service. There are many alternative ways of putting a vortex engine in service. A vortex engine would have a remote control room with a sophisticated control system capable of monitoring numerous process parameters and of manipulating valves and restrictors. For startup, the air inlets and outlets on the unused cells would be closed and the water flow to the unused cells would be closed. The vortex would be started by filling basin 55 in FIG. 4 of U.S. Pat. No. 7,086,823 or cooled water channel 736 in FIG. 7 with water possibly by pumping warm water through one of the startup cooling cells. The air flow through the starting cells would be started by injecting steam in their tangential entry ducts 421. Alternatively the air flow could be started by using forced draft fan 412 or underground intermediate tangential air entries 431. The quantity and quality of the steam would be controlled using steam valves and de-superheater water valves. Pressure would be monitored: at the center of the station, in the cooling cell and at other points. There could be video cameras to observe the vortex.

Establishing a vortex takes spin-up time. Once the vortex is established it may be necessary to quickly restrict the air flow to prevent damage to cell fill. The turbo-generators on the cell inlet would be then be started and brought up to load. The flow of air in each cooling cell would be monitored with flowmeters located either in the cell inlet or in the tangential entry duct. The water flow to each cooling cell and the temperature of the water entering and leaving the cells would be monitored. Once the vortex is established the additional cooling cells would be put in service by first establishing water flow and then air flow through the cell.

The pressure reduction at the base of the vortex would be monitored and the air flow would be restricted either at the cooling cell inlet turbine or in the tangential entry duct to keep the vortex at the desired intensity. The vortex would be stopped by reducing the direct air flow and if necessary opening reverse air flow.

DESCRIPTION

Figure 3:
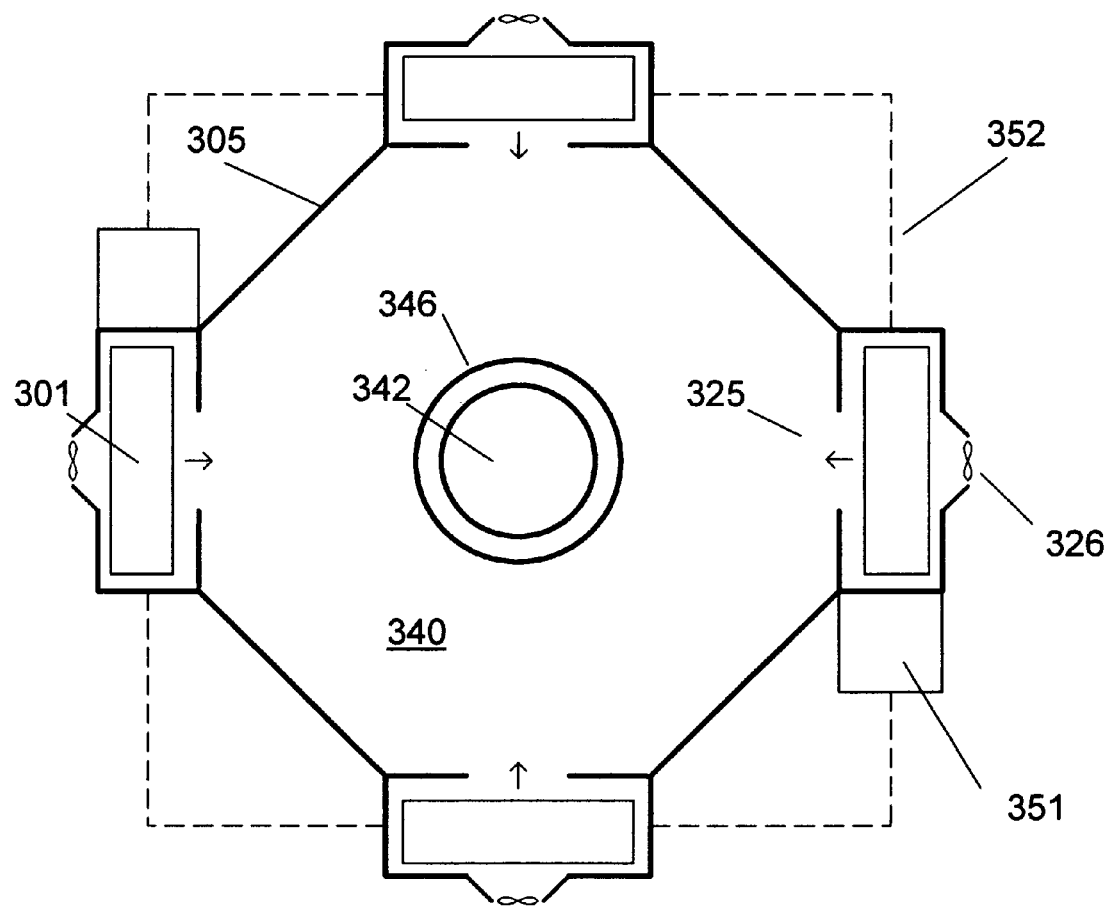
FIG. 3 is a plan view of circular cooling tower with forced draft fans in the tower inlet.
Figure 4:
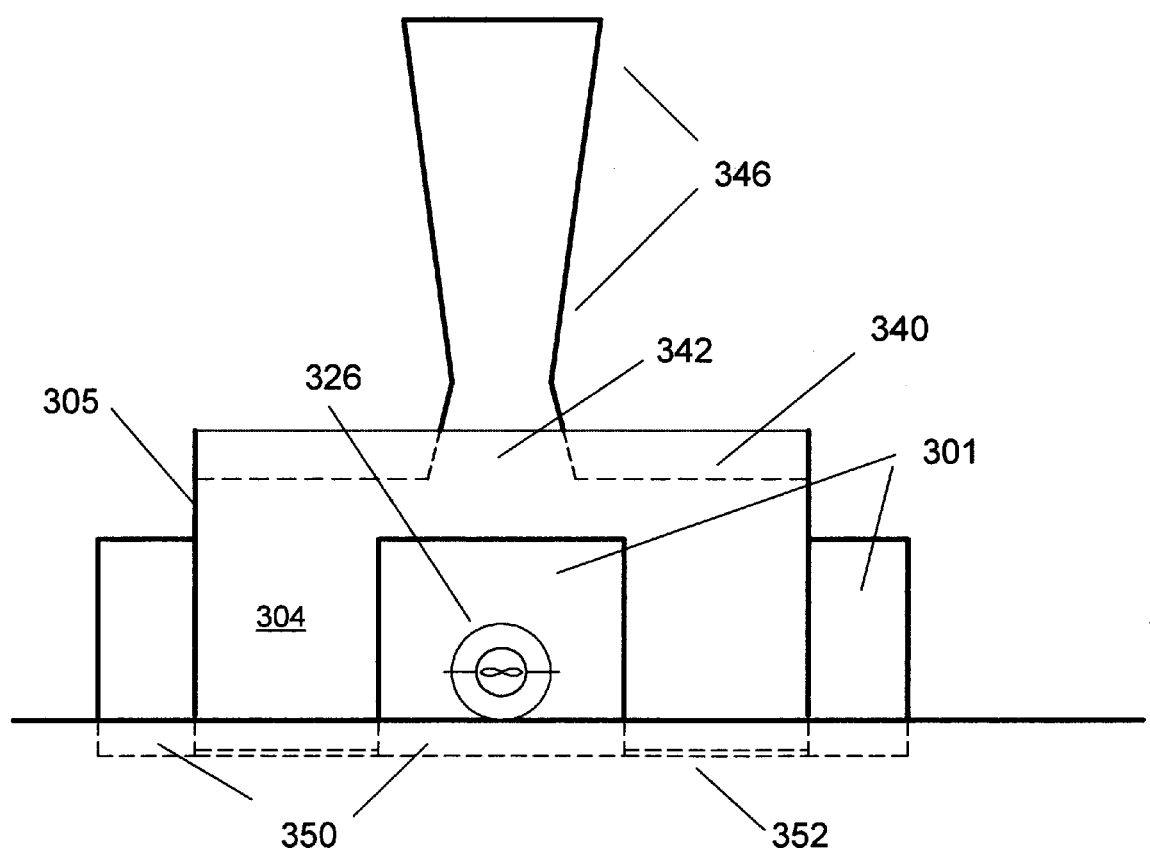
FIG. 4 is an elevation view of circular cooling tower with forced draft fans in the tower inlet.

FIGS. 3 and 4

FIGS. 3 and 4 show plan and elevation view of a circular cross-flow cooling tower with four heat exchangers (cooling cells) 301. These figures are for a small four cell cooling tower; the internal diameter of the arena 304 could be 50 m. Cylindrical wall 305 has an octagonal shape. Large circular forced draft cooling towers would have more cooling cells 301 and would be more circular in shape. The term "circular" should be interpreted to mean "not linear" and not "strictly circular". Arena 304 is the volume within cylindrical wall 305.

Forced draft fans 326 on the air inlet of each cell push air through the cell fill; the warmed air enters arena 304 via radial entries 325. Convergence roof 340 located above the radial air entries 325 has a circular opening 342 at its center. Arena 304, the volume under the convergence roof 340, forms a manifold where air from a number of radial entries 325 joins together before exiting through common stack 346. Cooled water basins 350 are located under each cell 301. The cooled water pumps are located in extension 351 of two of the cooling tower water basins 350. The cooled water basins 350 are joined by underground equalizing lines 352.

Stack 346 above central opening 342 can have convergent and divergent sections. Stack 346 can be supported on thin posts. Solid stack 346 extends high enough to reduce fogging and recirculation. The buoyancy of the warm air in the nozzle reduces the energy required to push the air through the cooling towers. With a high enough stack it may be possible to turn off forced draft fan 326 once the flow has been established. Physical stack 346 can be a fabric tube with a restricted opening at the upper end.

Operation

FIGS. 3 and 4

The operation of the circular cooling tower is similar to that of a conventional cross-flow forced cooling tower. It is not necessary for all cells 301 to be in operation. Cells 301 that are not in service can be isolated with dampers located either in the inlet of forced draft fan 326 or in radial entry 325. The circular cooling tower is started by first establishing warm water flow and then establishing air flow. The cell 301 would operate at close to atmospheric pressure and the warm water distributor tray need not be within the cell. The water flow to the individual cells could be adjusted with valves. The air flow and the temperature of the water at the individual cells would be monitored and controlled by manipulating the speed or pitch of the forced draft fan.

DESCRIPTION

Figure 5:
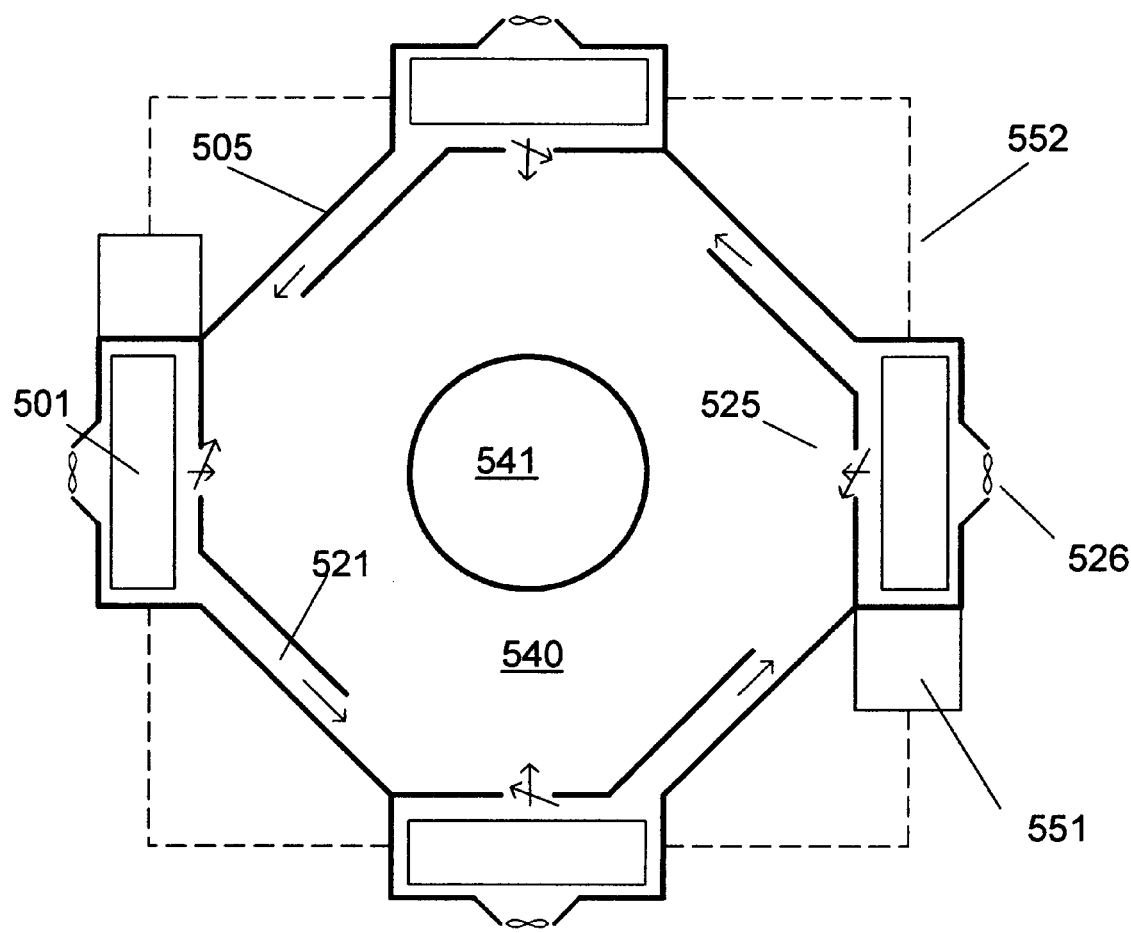
FIG. 5 is a plan view of circular cooling tower capable of operating in vortex or non-vortex mode.
Figure 6:
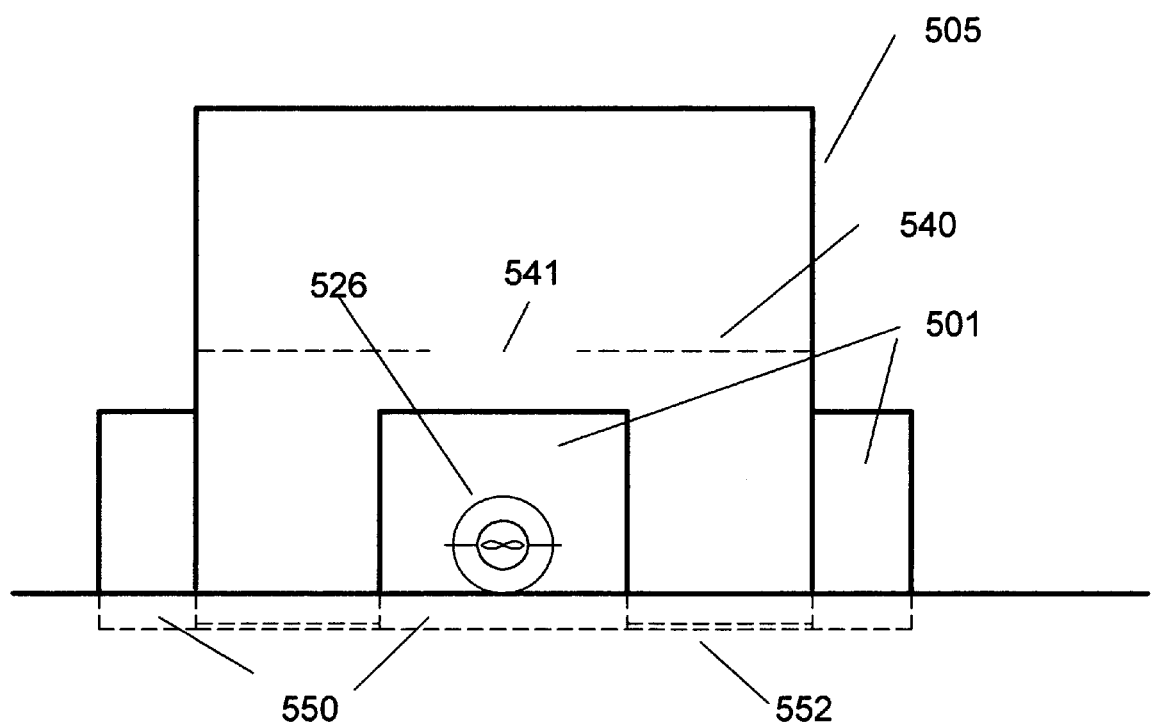
FIG. 6 is an elevation view of circular cooling tower capable of operating in vortex or non-vortex mode.

FIGS. 5 and 6

FIGS. 5 and 6 show plan and elevation views for a forced draft circular cooling tower capable of operating in vortex or non-vortex mode. Forced draft fans 526 push the air through heat exchanger (cooling cell) 501 and up through opening 541 in arena roof 540. Cylindrical wall 505 extends higher than cylindrical wall 305 of FIG. 4; stack 346 of FIG. 4 is not required.

The circular cooling tower can be switched from non-vortex mode to vortex mode by opening tangential entries 521 and by closing radial entries 525. Tangential entry 521 and radial entry 525 have restrictors. Restrictors could be rotating vanes. The rotating vanes in the tangential entry 521 could rotate in opposite direction about the horizontal axis. The rotating vanes in radial entry 525 could rotate in the same direction about the vertical axis to permit admitting air in the arena either radially or with reverse rotation. Alternatively radial entries 525 could be closed with removable panels when there is no need to operate in non-vortex mode. Restrictors at the inlet of forced draft fan 526 and in tangential entry duct 521 prevent the air flow from getting too large when the vortex mode becomes established.

There are cooled water basins 550 under each cell 501. The cooled water pumps are located in basin extension 551 of two of the cooling tower water basins. The cooled water basins are joined by underground equalizing lines 552.

Operation

FIGS. 5 and 6

This circular cooling tower can be designed to operate in one-mode or two-modes. In the one-mode model the unused air entry, either radial entry 525 or tangential air entry 521, would be closed with removable panels. The non-vortex mode would be a backup in case the owner does not want to operate in the vortex mode. Operation in the non-vortex mode would be similar to the operation of the non-vortex circular cooling tower of FIGS. 3 and 4. Operation in the vortex mode would be similar to the operation of the vortex cooling tower of FIGS. 1 and 2.

In the two-mode model, the mode would be switched from non-vortex to vortex by gradually closing radial entries 525 with vanes rotating about the vertical axis and gradually opening tangential entries 521 with rotating vanes. It may be necessary to reduce the flow in some of the cells 501 during the transition.

DESCRIPTION

FIG. 7

FIG. 7 shows a plan view of a vortex engine where the air inlet is not interrupted by gaps between cooling cells. The vortex engine has a uninterrupted front face 704. In FIGS. 1 and 5 every second side of the polygonal cylindrical wall has a cooling cell. In FIG. 7 every side of the polygon has a heat exchanger. The absence of gaps between heat exchangers reduces cooling tower cost. It is economically advantageous for circular vortex engine to have uninterrupted face and to have a heat exchanger on every side of the polygon.

Ambient air enters the heat exchanger 706 through turbine 712.

Warmed air enters cylindrical wall 702 via opening 781 at the lower end of cylindrical wall 702 and via linear tangential entry duct 714. Linear tangential entry duct 714 has an air inlet 782 and an air outlet 783. The area within cylindrical wall 702 has a convergence roof 716 with a circular opening 718 at its center. Warm water enters the top of heat exchanger 706 via warm water inlet pipe 732. Cooled water from the cooled water collector located under the heat exchanger drains to open circular channel 736 via underground cooled water pipe 734. The cooled water flows to pump sump 738 whence it is pumped to through process coolers before returning to heat exchanger 706 via warm water inlet pipe 732. Circular cooled water channel 736 is an alternative to cooled water basin 55 of FIG. 4 of U.S. Pat. No. 7,086,823 located under the cooling cell. Circular water channel 736 facilitates the use of shared cooled water pumps located in sumps 738 away from the heat exchangers 706.

Operation

FIG. 7

The cooling tower of FIG. 7 operates similarly to the cooling tower of FIGS. 1 and 2.

DESCRIPTION

FIG. 8

FIG. 8 shows a side view of a heat exchanger 804. Heat exchanger 804 of FIG. 8 is a wet cross-flow cooling tower cell and is referred to as a cooling cell in the following description. Cooling cell 804 abuts the outside of cylindrical wall 802. Cooling cell 804 has a sub-atmospheric enclosure 807. Ambient air enters cooling cell 804 through turbine 850 which drives generator 852. Turbine 850 has an air inlet 865 and an air outlet 866. Perforated baffle 854 distributes the air evenly across the face of the cell fill 814. Air flows horizontally through fill 814; entrained liquid is separated from the warmed air by drift eliminators 818. The fill 814 slopes inwardly to correspond to the pull back drag effect of the air on the falling water. Inlet louvers 816 bring water not dragged sufficiently by the air flow back towards fill 814. The warmed air enters the arena via tangential entry 856. Convergence roof 858 forces the warm air to converge before it can rise.

Cooling cell 804 has an air inlet wall 805 and an air outlet wall 806. The outside of cylindrical wall 802 serves as the outlet wall 806 of cooling cell 804. Linear tangential entry duct 856 is inside cylindrical wall 802. The inside of cylindrical wall 802 serves as the outside wall of tangential entry duct 856. The air outlet of cooling cell 804 is connected directly to the air inlet of linear tangential entry duct 856 through an opening in cylindrical wall 802. Tangential entry duct 856 is parallel to the side of polygonal cylindrical wall 802 adjacent to the side along which associated cooling 804 cell abuts. Heat exchanger 804 has an air inlet 891 and an air outlet 892.

Warm water enters cooling cell 804 via warm water pipe 810. The warm water then goes to warm water distributor tray 812. Warm water distributor tray 812 is similar to the warm water distributor tray in conventional cross-flow cooling tower. Warm water distributor tray 812 has a large number of cross-flow nozzles 813 on its bottom. Cross-flow nozzles 813 are widely used in cross-flow cooling towers. There could be over one thousand cross-flow nozzles per warm water distributor tray. The cross-flow nozzles 813 are located on a grid approximately 30 cm apart. The cross-flow nozzles 813 could have an internal diameter of 1 to 2 cm and a built-in target downstream of the nozzle to breaks up the water jet into small droplets. The water level in distributor tray 812 could be 2 to 20 cm. The flow through cross-flow nozzles 813 depends on the pressure difference between cross-flow nozzle 813 inlet and cross-flow nozzle 813 outlet. Cross-flow nozzle 813 pressure difference is affected by both the water level in distributor tray and by the difference in pressure between the top and bottom of distributor tray 812. Warm water distributor tray 812 must be located within sub-atmospheric enclosure 807 to ensure that the pressure on the top and bottom of warm water distributor tray 812 are the same and that cooling cell 804 pressure does not affect warm water flow through the cross-flow distributor nozzles 813. With equal pressures on the top and bottom of warm water distributor tray 812, the only factor affecting water through cross-flow nozzles 813 is the height of water in warm water tray 812.

In FIG. 4 of U.S. Pat. No. 7,083,823, warm water distributor tray 53 is located outside sub-atmospheric pressure enclosure 23. While ambient pressure is typically 100 kPa the pressure in the cooling cell 61 can vary between 100 and 80 kPa. With the distributor tray outside sub-atmospheric enclosure 61, the effect of small changes in cooling cell pressure on cross-flow nozzles 813 flow can be greater than the effect of the water level in distributor tray 53. For this reason the warm water distributor 812 tray must be within cooling cell 804. Installing warm water distributor tray within cooling cell 804 ensures that cross-flow nozzle 813 flow is only a function of the water level in distributor tray 812 and that flows in the cross-flow nozzle are independent of cooling cell 804 pressure.

Cooled water drains from the collection area at the bottom of cooling cell 804 through drain pipe 820 and flows to open cooled water channel 824. The water level in cooled water channel 824 is approximately one meter higher than the top of cooled water pipe 820. The water level in cooled water channel 824 forms a seal 822 preventing ambient air from entering the cooling cell via cooled water drain 820. Water level in drain pipe 820 is slightly higher than in cooled water channel 824 because the pressure in the cooling cell is sub-atmospheric. The elevation of the floor of the arena 842 is close to grade 840. The water level in channel 824 is maintained at a few meters below grade 840 and approximately one meter above the top of drain pipe 822. Cooled water pump 826 driven by motor 828 circulates the cooled water via pipe 830. The cooled water inventory of the cooling system is mainly held in circular cooled water channel 824 and its pump sump 738 in FIG. 7.

Operation

FIG. 8

The tower of FIG. 8 operates similarly to the tower of FIGS. 1 and 2.

DESCRIPTION

FIGS. 9 and 10

FIGS. 9 and 10 show plan and elevation views of a vortex cooling tower with an elevated floor 903. Under-floor plenum 906 can be used to route starting air tangentially at intermediate radius in lieu of underground airway 431 of FIGS. 1 and 2 or to route air to the center of the vortex in lieu of underground tunnel 435 of FIGS. 1 and 2. Underground plenum 906 can be divided into compartments with radial walls or can be an open space except for support columns. FIGS. 9 and 10 show the preferred embodiment.

Vertical axis cylindrical wall 905 is polygonal in shape, has a lame opening 963 at the top end 962, and a multiplicity of small openings 981 at the lower end 961. The station has a multiplicity of heat exchangers 901 which in the figure are one-sided wet cross-flow cooling cells. Each heat exchanger 901 has a tangential entry duct 921 into arena 904. Each heat exchanger 901 has an air inlet 991 and an air outlet 992. Heat exchanger air outlet 992 is connected to air duct air inlet 982 via via opening 981 at lower end 961 of cylindrical wall 905. Tangential entry duct 921 has an inlet end 982 and an outlet end 983. Tangential entry duct has an inner wall 987 and an outer wall 988. Tangential entry ducts 921 have adjustable inlet flow restrictors 922, entraining steam jets 925, and can have outlet straightening vanes not shown. Each cooling cell has an inlet turbo-generator 911 and can have an inlet forced draft fan not shown.

The cylindrical wall could be 200 m in diameter by 100 m high. A 200 m diameter atmospheric vortex engine could have 40 cells and each cell could have a 5 MW turbo-generator 911 for a total electrical power production of 200 MW. Turbo-generator 911 comprises turbine 966 driving generator 967.

There is a convergence roof 951 with a central opening 955 over arena 904. Tangential entry ducts 921 are the primary air entry into arena 904. The air circulation within arena 904 can be reduced by closing main restrictors 922 and opening reverse direction restrictors 927. Intermediate radius air entries 932 in elevated floor 903 can be used to let in air from plenum 906 enter arena 904 tangentially at reduced radii. Intermediate radius tangential entries 932 can have direct rotation to help establish the vortex or can have reverse rotation to help stop the vortex. Intermediate radius entries with direct rotation can have steam injectors.

Under-floor circular room 941 located at the center of the station has a roof 942 with a circular opening 945. Opening 945 can have an adjustable diameter. Warm humid air from the cooling cell can be routed to the under-floor plenum 906 via restrictors 916. Ambient air can also be routed to floor opening 945 without going through cooling cell 901 via under floor plenum 906, not shown. The ambient air can go through turbines located upstream of plenum 906. There can be a peripheral wall 917 with air entries between plenum 906 and circular room 941. Alternatively 917 can be a ring of adjustable deflectors allowing air to be directed tangentially or radially. Alternatively peripheral wall 917 can be omitted.

Heat exchanger 901 has a warm water inlet 907 and a cooled water outlet 908. Water flow is described in more detail in the description of FIG. 7 and FIG. 8.

Transition rings 952 inhibit ambient air entrainment downward along the inside of the cylindrical wall. Inter-ring air entry 953 in the transition zone between convergence roof 951 and transition rings 952 permits the introduction of air with appropriate tangential velocity. Inter-ring air entries 953 can have restrictors and steam injection.

New Elements

U.S. Pat. No. 7,086,823 described a generic vortex engine. The present specification describes enhancements to the original invention and new combinations of elements. This New Element section describes the new features.

(a) Linear Tangential Entry Duct

Linear tangential entry ducts 921 of FIG. 9 are an improvement over tangential entry deflectors 103 of FIG. 1 of U.S. Pat. No. 7,083,823. The angle of entry of the air in the arena can be closer to tangential with ducts than with deflectors. Achieving entry as tangentially as possible with deflectors requires a large number of deflector vanes per cooling cell. The linear entry duct approach only requires one duct per cooling cell. The deflector approach requires a multiplicity of vanes for each cooling cells. Accessories such as steam jet 925 and restrictors 922 of FIG. 9 have to be duplicated for each deflector while they are only required once per cooling cell with linear tangential entry ducts.

The linear tangential entry ducts are located inside the cylindrical wall. The straight sides of the polygonal cylindrical wall permit having straight entry ducts. The duct is located along the inside of the polygon. The air outlet of the heat exchanger is connected directly to the air inlet of the linear tangential entry duct via an opening in the cylindrical wall.

Internal linear tangential entry ducts arrangement have several advantages:
1. Makes possible angle of entry closer to tangential.
2. A large number of deflector vanes would be required to achieve the same tangential entry result as can be achieved with a single linear tangential entry duct.
3. Locating the tangential entry duct on the inside of the cylindrical wall and the cooling cell on the outside of the cylindrical wall minimizes the length and cost of the duct.
4. A polygonal cylindrical wall permits the use of straight tangential entry ducts.
5. Restrictor can be provided within the entry duct.
6. There can be more than one device for blocking the duct to ensure that the air flow to the arena can be shut off to stop he vortex in an emergency.
7. Steam can be injected in the duct to entrain and heat the air, thereby initiating the vortex.
8. The turbulence in the air entering the arena can be reduced by providing straightening vanes or perforated screens within the duct.
9. The velocity of the air entering the arena can be manipulated by adjusting the cross sectional area of the duct.
10. Closing the duct provides a way of servicing the equipment upstream of the duct, namely the cooling tower and the turbine, without stopping the vortex.
11. The air circulation in the arena can be reversed by closing the direct entry air entry via the tangential entry duct and by opening air entries with reverse circulation.
12. The tangential entry duct can be divided in a lower and an upper part, wherein the lower part is used to bring air next just above floor level, and wherein the upper part is used to bring in air at higher level.
13. The invention can be operated in non-vortex mode by closing the tangential entries and by opening radial entries.

(b) Floor Central Opening

There can be a circular opening in the center of the arena floor whereby air can be routed to the center of the vortex. The diameter of the opening can be adjustable. Ambient air or warm air from the heat exchangers can be routed to the central floor opening via underground tunnels or via a plenum under an elevated floor. The quantity of air entering the vortex via the central air entry can be controlled with restrictor.

(c) Under-Floor Circular Room

There can be a circular room under the floor central opening. There can be a ring of deflectors around the periphery of the circular room whereby the tangential velocity of the air can be controlled. The air can thus enter the circular room either tangentially or radially. Admitting air radially in the center of the vortex eliminates centrifugal force thereby increasing turbines differential pressure and mechanical energy production.

In U.S. Pat. No. 7,086,823 the angle of entry of the air in the arena is controlled by adjusting deflector orientation or by selecting deflectors with the appropriate orientation. In U.S. Pat. No. 7,086,823 the air entering the arena via the upper deflectors can have a more tangential angle of entry than the air entering the arena via the lower deflectors. In the present specification the tangential velocity of the air entering the arena is maximized through the use of tangential entry ducts. In both U.S. Pat. No. 7,086,823 and in the present specification the tangential velocity of the air immediately above the floor can be reduced by surface friction, by surface roughness or by surface friction flaps. In the present specification the tangential velocity of the air in a lower entry level can be eliminated by routing air to the center of the vortex via a floor central opening. In the present specification the tangential velocity profile is controlled by varying the flow distribution between the tangential entry duct and the central floor opening.

(d) Elevated Floor

The surface under the vortex, called the floor, is a very important element in a convective vortex because tangential velocity is reduced by friction more next to the floor than at higher elevation. At higher elevation the horizontal pressure gradient is balanced by centrifugal force. The reduced centrifugal force next to the floor makes it easier for the air to converge next to the floor than higher up. As a result air convergence occurs mainly in the layer next to the floor. Convergence can be enhanced by increasing the roughness of the floor surface or by providing friction enhancing devices such as: a rough surface, friction flaps or small protrusions on the floor. The floor of a vortex engine can be at grade as shown in FIG. 2 floor 403 or can be elevated as shown in FIG. 10 floor 903.

An elevated floor has the following advantages:
1. The air entering the arena comes preferentially from the upper part of the cooling cell where the air is warmest.
2. The downward distance air from the top of the heat exchanger has to travel to get to the vortex floor is reduced.
3. The requirement for providing guide vanes to prevent the air from being taken preferentially from the bottom of the cooling cell is reduced.
4. The area under the elevated floor can serve as a plenum for routing air to the central room.
5. Warm air from the cooling cells can be routed radially to the center of the vortex via the under-floor plenum by closing the tangential entry duct and opening adjustable restrictors between the cooling cell and the under-floor plenum.
6. Turbine exhaust can be routed to the center of the vortex via the under-floor plenum with or without going through cooling cells.
7. Radial entry in the center of the vortex via the under-floor plenum eliminates centrifugal force and increases the differential pressure available at the turbine.
8. The cost of a concrete elevated floor is less than the cost of a multiplicity of underground ducts and tunnel.
9. The under-floor plenum can be divided into compartments separated by radial wall or left open except for the columns required to support the floor.

(e) New Vortex Cooling Tower Features

The preferred heat exchanger is a single sided cross-flow cooling tower. The cooling tower differs from normal cross-flow cooling tower in that it operates at sub-atmospheric pressure. The cooling tower has a warm water distributor tray with distributor nozzles at the top and can have a cooled water basin at the bottom (FIG. 4 basin 55, of U.S. Pat. No. 7,086, 823). Alternatively the cooled water can drain to a peripheral circular channel via a water seal (FIG. 7 channel 736, FIG. 8 channel 824). The warm water distributor tray is located within the sub-atmospheric enclosure to provide a constant differential pressure across the distributor tray nozzles. The annular warm water basin extends radially outward from the cooled water basin. The fill slopes inward from top to bottom to match pull back of the falling water by the air flow. The front face of the cooling tower has louvers to catch any water not pulled back by the air flow and return it to the cold water basin. The fill can be splash bar type or film type. Drift eliminators downstream of the fill remove entrained water droplets and return them to the cooled water basin.

The fill with associated inlet louver, drift eliminators, warm water distributor basin, cooled water basin, and drift eliminator and their enclosure, is called the "cooling cell". A cooling cell with associated turbo-expander, optional forced draft fan, and tangential entry duct is called a "sector". An ensemble of cooling cells including the cooled water pumping system is a "cooling tower". A circular cooling tower with a vortex at its center is a "vortex cooling tower". The generic term "Atmospheric Vortex Engine" designates the device for producing a convective vortex. The heat exchanger and the turbines are not essential to an atmospheric vortex engine. The heat exchange means is not required when the ambient air has sufficient temperature and humidity. When there is no heat exchanger, the turbines exhaust directly into the tangential entry duct.

Atmospheric vortex engine cooling cells must be fully enclosed to permit operation at sub-atmospheric pressure. Cooling cells require an inlet wall not present in conventional cross-flow cooling tower. Air enters the cooling cell through an opening in the cell air inlet wall. Inlet baffles distribute the air evenly over the louvered face of the fill. Warm-humid air exits the cooling cell via the tangential entry duct. The tangential entry duct is inside of the cylindrical wall. The tangential entry duct of a cooling cell runs along the adjacent side of the polygonal cylindrical wall. Guides vanes may be provided to ensure that the air entering the tangential entry duct is taken form all levels of the cooling cell. There can be additional adjustable air entries from the cooling cell to the arena. These additional air entries may be radial air entries or reverse rotation air entries.

It is not necessary for all sectors to be in service. Sectors can individually be taken out of service by closing their tangential entry duct. A cooling cell and its turbine can be taken out of service by closing its warm air outlets, by shutting off its water inlet, and by opening its air inlet.

The sectors must be separate on the air side and on the water side. There must be seals on the cooled water side to prevent air from traveling between cells. The seal can be achieved by a variety of methods including:
(a) extending the inter cell wall to the bottom of the cooled water basin (FIG. 4 air seal wall 49 of U.S. Pat. No. 7,086, 823),
(b) providing a water seal by having the cooled water enter a cooled water channel below the water level in the cooled water channel (FIG. 8 cooled water seal 822),
(c) forcing the cooled water from the cooling cell flow down through an upright "U" located upstream of the cooled water channel, not shown.

The preferred cooled water system replaces the conventional cooled water basins located under cooling cells with a sloped cooled water collection floors. The cooling cell floors drain to the open circular cooled water channel via underground pipes. The water in the channel forms a seal and prevents air from entering the cooling cells via the cooled water return. The cooled water flows to a sump where the circulating water pumps are located. The inventory of cooled water is mainly in the circular cooled water channel and in the sump.

Air must be prevented from entering the cooling cells via the cooled water return because the pressure in the cooling cells is lower than atmospheric pressure. The water level in the channel should be high enough above the top of the cooled water pipe to prevent air from entering the individual cell through the cooled water outlet. The water level in the circular channel is controlled with conventional cooling towers makeup techniques. There can be more than one pump basin permitting sections of the circular cooled water channel to be taken out of service for maintenance without stopping the vortex. The circulating water does not normally enter the arena. There would be drains at low points in the arena to remove water that may inadvertently enter the arena.

(f) Convergence Roof

The atmospheric vortex engine and the circular cooling tower can both have a convergence roof with an opening in its center above the main air entry. The diameter of the opening at the center of the roof can be adjustable. In the vortex mode, the convergence roof creates a convergence area wherein tangential velocity must increase as the air converges in order to conserve angular momentum. In the non-vortex mode the convergence roof serves to bring the multiplicity of cooling tower air outlets together in a single plume. In a non-vortex circular cooling tower, there can be a stack above the convergence roof opening.

Convergence roof 951 of FIG. 10 is similar to the annular roof 11 of FIG. 4 in parent specification U.S. Pat. No. 7,086, 823 but the purpose is different. The purpose of the parent patent annular roof was to keep the air entering through the lower and upper levels of deflectors separate. The parent specification annular roof had to be located immediately above the lower deflector 3 of FIG. 4 of U.S. Pat. No. 7,086, 823. The purpose of the new convergence roof 951 of FIG. 10 is to force convergence thereby forcing tangential velocity to increase in order to conserve angular momentum. Convergence roof 951 of FIG. 10 can be a distance above the top of tangential entry ducts 921.

While the convergence roof is shown flat in the figures, it can have other shapes, including:
  a constant upward slope from rim to central opening,
  a nozzle consisting of an increasing upward slope from rim to central opening,
  a dome with a central opening.

(g) Transition Rings

An atmospheric vortex engine can have a plurality of transition rings between the main convergence roof and the top of the cylindrical wall. The vortex transitions from a confined vortex to a free vortex as it moves up from the opening in the convergence roof to the free atmosphere. Transitions rings ease the transition. The transition rings reduce the quantity of ambient air entrained downward along the inside of the cylindrical wall. Entrainment of ambient air in the vortex can reduce angular velocity. There can be tangential air entries between the convergence roof and the transition ring and between transition rings to provide air with rotation for entrainment in the vortex during the transition. These inter-ring air entries can have restrictors and steam injection.

(h) Entraining and Heating Steam

There are several options for starting the vortex:
1. Using steam jets in the tangential entry duct to entrain air into the arena while heating and humidifying the air.
2. Heating the air within the arena with fuel or steam,
3. Pushing the air through the tangential entries with forced draft fans located at the cooling tower inlets or outlets.

Steam jets in the tangential entry duct are the preferred starting method because steam is usually available at cooling tower sites and because steam injection equipment is less costly to purchase and maintain than fans. The steam can be superheated to make the mixture invisible or water can be injected in the steam in a de-superheater to make the vortex visible.

(i) Intermediate Radii Floor Tangential Air Entries

Intermediate radii air entries can introduce air tangentially through the arena floor. The air could be brought to the intermediate radii floor tangential air entries via underground airways or via air plenum located under an elevated floor. Underground airways could enter the arena tangentially and could have a curved rising section at their downstream end. The curved section would rise gradually over an arc of roughly 30 to 120 degrees. Intermediate radii floor air entries could have direct and indirect rotation. There would be devices for controlling the air flow in the floor air entries. The intermediate radii floor tangential air entries with direct rotation could have steam jets. Starting a vortex with air entry at the cylindrical wall only can require a long spin-up time. Introducing air with direct rotation tangentially at intermediate radii would help start the vortex by reducing spin-up time. Airways with indirect rotation would be used to help stop the vortex and would not have steam injection.

(j) Non-Vortex Circular Cooling Tower

Cooling towers with fans are called "mechanical cooling towers". The fans in mechanical cooling towers can be in either of two locations. Forced draft cooling towers have their fans in the air inlet, usually at grade. Induced draft cooling towers have their fans in the air outlet, normally at the top of the cooling tower. Induced draft cooling tower are more common than forced draft cooling towers because the low exit-velocity of cooling tower with forced draft towers results in fogging and recirculation. Fans in induced draft cooling towers are invariably vertical axis axial flow fans. Fans in forced draft cooling towers are usually horizontal axis centrifugal blowers.

There are two ways of contacting the air and the water. In counter-flow tower the water flows down and the air flows up. In cross-flow towers the water flows down and the air flows horizontally across the falling water.

The cooling cells of mechanical cooling towers can be arranged in linear or circular arrays. Mechanical circular cooling towers usually have a plurality of top mounted induced draft fans. A circular arrangement reduces recirculation and fogging because a single large plume retains its buoyancy longer than a multiplicity of small plumes, and because the circular shape alleviates recirculation on the downwind side by allowing the wind to flow around the tower.

Mechanical circular cooling towers usually have induced draft fans. Mechanical circular cooling towers were developed after the advantage of induced draft fans over forced draft fans had been demonstrated in linear cooling towers. The idea that a circular cooling with a central air outlet could permit reverting to the earlier forced draft fan approach does not seem to have been considered.

The fans in the circular cooling tower of the non-vortex circular cooling tower can be located in: the cooling cell outlet, in the cooling cell radial outlet, or in the tangential entry duct, but not in the combined cooling tower outlet. Locating the fans in the combined outlet would preclude having a single large plume. Locating the fans in the air inlet to the cooling cell as shown in FIG. 3 fan 326 is the preferred arrangement. Fans located at the cooling cell inlets have the following advantages: fans are easily accessible for maintenance, the fan position is suitable for either non-vortex or vortex mode. Fans located at cooling cell outlets eliminate the need for entrance walls and their resistance to flow, but are less easily accessible.

Fans in induced draft circular cooling towers are grouped together at the top of the tower. The fans can be grouped in the center of the tower or can be located on the periphery of a circle located inward of the heat exchange area. The need for a multiplicity of fans and for horizontal spacing between fans increases plume diameter, reduces average plume upward velocity, and increases opportunity for entrainment of surrounding air into the plume. Circular cooling tower technology is described in U.S. Pat. No. 3,743,257 by Fordyce.

U.S. Pat. No. 4,164,256, by Kelp, describes a counter-flow natural draft cooling tower with forced draft fans. There are stubby fan assisted natural draft cross-flow cooling towers that have vertical axis fans grouped at the top of a central area. Circular wet cooling towers comprising: cross-flow cells, forced draft fans at individual cell inlets or horizontal axis fans at individual cell outlet, and a central stack significantly smaller in diameter than the inner diameter of ring of cooling cells have not been used.

A circular cooling tower with fans at cooling cell inlets or outlets has the following advantages:

1. The single large plume retains its buoyancy longer than a multiplicity of small plumes.
2. Circular cooling towers cause less fogging and recirculation than linear cooling towers because their shape provides less opportunity for recirculation. In circular cooling towers the plume is carried down wind and away from the tower; in linear cooling tower the tower blocks cross wind causing recirculation.
3. The cross-flow cooling cells exhaust radially in the central arena.
4. A convergence roof with a circular opening at its center brings the air outlet from a multiplicity of cooling cell together into a single large plume.
5. A stack, similar to the cylinder of an induced draft fan, can be provided above the central opening. The stack reduces entrainment of ambient air in the plume. The stack reduces fogging by raising the base of the plume. The upward velocity of the air at the outlet of the stack would be comparable to the outlet velocity of individual induced draft fans and higher than the average upward velocity of grouped induced draft fans. The stack raises the base of the plume thereby reducing fogging and recirculation.
6. The buoyancy of the air rising in the stack assists the forced draft fans in producing circulation thereby reducing the fan power requirement. The fans can be turned off when not needed such as in cold weather or at low cooling loads.
7. The stack could be a tall fabric tube. The fabric tube could be slipped over a short physical stack and raised gradually. The size of the opening at the upper end of the fabric tube could be adjustable. The fabric tube would be raised by blowing air in the tube with the forced draft fans. The fabric tube could extend higher than a physical tube and could be less costly. The fabric tube could be fabricated of sail material such as Dacron or nylon.

8. Forced draft fans located at ground level do not require the strong supporting structure required for induced draft fans thereby reducing structure cost. Supporting induced draft fans located near the center of a circular cooling tower requires a sophisticated and costly structure.

9. Induced draft circular cooling towers with a single fan are impractical because of the limitation on fan size. A forced draft circular cooling tower permits combining the flow from a multiplicity of forced draft fans in a single large plume. The stack could be 20 to 50 m in diameter.

10. The circular cooling tower can be provided with both radial air entries and tangential air entries ducts permitting the mode of operation to be switched from non-vortex to vortex mode by closing radial entries and opening tangential entries.

11. In the vortex mode the fans are only required for startup and can be turned into a power producing turbines once the vortex has been established.

12. A forced draft circular cooling tower can be a useful and economical device by itself without the use of the vortex mode.

Thermodynamic Basis (a) Troposphere as a Heat Sink

Thermodynamic or thermal engines are devices wherein heat is converted to work. A solar engine is a thermal engine wherein the heat source is the sun. Thermal engines function by converting a fraction of the heat or thermal energy transported from a hot source to a cold source to mechanical energy. The cold source is commonly called the cold sink or simply the sink. The fraction of the heat input converted to work called the efficiency increases with the temperature difference between the heat source and the heat sink. The maximum possible efficiency of a thermal engine is the Carnot efficiency (n) defined as $$n = 1 - (T_c/T_h)$$

where $T_h$ and $T_c$ are respectively the temperatures of the hot source and of the cold source in degrees absolute. The Carnot efficiency of an engine with a hot source temperature of 300 K (27° C.) and a cold source temperature of 240 K (−33° C.) is 20%. Carnot efficiency can be increased by increasing hot source temperature or by decreasing cold sink temperature. The heat sink temperature for the vast majority of thermal engine is the lowest temperature available at the engine location which is usually close to the temperature of the air or water at the engine location.

Carnot efficiency is merely the maximum possible efficiency for a given temperature difference. The actual efficiency of an engine is typically significantly lower than the Carnot efficiency. Thermal engines require that the heat be transported in a process involving compressing and expanding a gas or a vapor. The efficiency reduces to near zero if the heat is transported by conduction, by convection with a liquid, or by gaseous convection without the use of an expander.

The troposphere is the bottom 10 to 20 km of the atmosphere, the layer of the atmosphere wherein temperature normally decreases with height. Temperature in the troposphere typically decreases in the upward direction by about 6 K/km. The temperature at the bottom of the troposphere is typically 290 K. The temperature at the top of the troposphere is typically 220 K. The troposphere radiates heat to space at an average temperature of around 250 K. Radiation to space cools the troposphere by roughly 1 to 2 K/day. The bottom layer of the troposphere is called the boundary layer and typically extends from the earth's surface to the level of the bottom of fair weather cumulus which is typically at the 0.5 to 3 km level.

The invention is described using the term "lower troposphere" to designate the bottom 1000 m of the atmosphere, and the term "upper troposphere" to designate the atmosphere above the 1000 m level. The invention involves transferring heat from the lower layer of the troposphere to the upper layer of the troposphere. Using the troposphere as a heat sink can provide a lower heat sink temperature than simply using the air at the bottom of the atmosphere. Using the high troposphere as a cold sink has not been considered previously because it is generally considered impractical either to bring the cold air down or to bring the fluid to be cooled up.

A thermal engine involves: transferring heat to the hot source, transferring heat away from the cold source, and transporting heat from the hot source to the cold source. The work is produced when the heat is transported from the hot source to the cold source and not necessarily when the heat is received by the hot source or given up by the cold source. In most engines the three processes occur simultaneously, but they need not be simultaneous. Simply adding heat to or removing heat from reservoirs does not produce the work. Transporting heat from the hot source to the cold sink with an engine is what produces work. There is no need for the heat transfer to occur at the same time as the heat transport. The heat transported by the atmospheric vortex engine can be accumulated in the boundary layer over a long period of time and the radiation to space from the cold upper troposphere can occur long after the upward heat transport and can take place far away from where the upward heat transport occurred. The raised air can be cooled gradually by radiation to space as it subsides.

The availability of a cold source significantly colder than the temperature at the bottom of the atmosphere makes it possible to produce work from low temperature heat sources such as natural warm humid air. The vast majority of thermal engines use gas or vapor to transfer heat from the hot source to the cold source. Gas and vapor engines are typically comprised of compressors and expanders. Compressors and expanders typically have efficiencies in the 80% to 95% range which reduce the overall cycle efficiency. Compressing a low density gas requires huge machines and is very costly. In the atmosphere subsiding air is compressed as it descends. The efficiency of this atmospheric compressor can be close to 100%. There are virtually no friction loss as the slowly subsiding air descends. When air is compressed its temperature increases. The temperature increase when air is compressed through atmospheric subsidence is lower than the temperature increase when air is compressed in a conventional compressor because there is less friction and because heat is radiated to space during the compression process. Air typically takes approximately 30 days to subside from the top to the bottom of the troposphere while being cooled by radiation to space. Without radiation to space, the subsiding air would have a temperature of 340 K when it would reach the bottom of the atmosphere. With radiation to space the subsiding air has a temperature of around 290 K at the bottom of the atmosphere.

Industrial processes using the troposphere as the cold sink, include:
Solar chimneys,
Natural draft cooling towers,
Aircraft engines (reciprocating and jet engines),
The atmospheric vortex engine.

Natural draft cooling towers have been used to avoid having to supply mechanical energy to drive fans but have not been used to produce energy. The mechanical energy produced by aircraft engines must be used locally and can not be transmitter to the ground. The solar chimney is the only existing process capable of producing mechanical energy at a fixed ground based location. Solar chimneys higher than 1 km are not presently practical and therefore solar chimneys can not make use of the part of the troposphere above 1 km as a heat sink. The atmospheric vortex engine is the only stationary engine that can use the upper troposphere as a heat sink. The efficiency increases with height as cold sink temperature decreases. The maximum efficiency of a 200 m high solar chimney is 0.7%. The maximum efficiency of a vortex engine where the vortex extends to a height of 20 km could be up to 30%. The atmospheric vortex engine is the first practical method of using the extremely cold upper layers of the troposphere as a heat sink.

(b) Unaltered Natural Heat Collector

Engines, which produce mechanical energy in the form of shaft work, usually require a temperature differential of well over 100° C. Convective processes such as natural draft cooling towers, reboilers and coffee percolators, which do not usually produce shaft work, operate with lower temperature differential. Since the cold source temperature is normally the temperature at the bottom of the atmosphere, the minimum hot source temperature for engines that produce shaft work is usually well over 100° C. Engines producing shaft work usually require a minimum working fluid temperature of over 100° C. at the start of the expansion process.

The working fluid in the atmospheric vortex engine is warm humid air. The work produced when air is raised depends on both the temperature and the humidity of the air. Enthalpy is a measure of the combined heat content of air. The enthalpy of air with 100% relative humidity at 30° C. is higher than the enthalpy of 40° C. air with 40% relative humidity. Water at 30° C. can be used to increase the heat content of low humidity air or low temperature air. The use of water as the heat source further increases the ability to use low temperature heat sources. Water at 30° C. can be used to increase the enthalpy of 40° C. air.

By using the upper troposphere as the cold source, the atmospheric vortex engine is able to use a hot source close to the temperature at the bottom of the atmosphere. The availability of a low temperature heat sink makes possible the use of low temperature heat sources including the use of working fluid having temperatures close to the temperature at the bottom of the atmosphere at the start of the expansion process. The atmospheric vortex engine is the only thermal engine that can use hot sources at temperatures of less than 50° C. to produce shaft work with heat to work conversion efficiencies of 5% or greater. The atmospheric vortex engine is the only solar engine wherein the Earth's land and sea surface in their unaltered state can be used as the heat collector.

The cost of solar collectors alone prevents solar engines from being competitive with conventional power sources. The atmospheric vortex engine can eliminate the need for the costly solar collector. Through the use of a low temperature heat sink, the atmospheric vortex engine eliminates the need for the solar heat collector. The atmospheric vortex engine is the only solar engine that can use the earth's surface in its unaltered state as a solar heat collector.

ALTERNATIVES ARRANGEMENTS

While the invention has been described with reference to specific embodiments, modifications and variations of the invention may be constructed without departing from the scope of the invention defined in the claims.

It is not necessary that each sector have a heat exchanger with a tangential entry into the arena and an entry in the plenum. In FIGS. 9 and 10 each heat exchanger 901 has a tangential entry 921 into the arena 904 and an under-floor air entry 916 to the plenum 906 both of which have restrictors. It is not necessary for each heat exchanger to have both kinds of entries. Some heat exchangers could have only tangential entry 921, some heat exchangers could have only under-floor entry 916, and some heat exchangers could have both tangential entry 921 and under-floor entry 916. The design could permit having the warm air outlet of every second or fourth heat exchangers 901 routed to arena 904 and the air warm air outlet of the remaining cells 901 routed to the under-floor plenum 906 only. There could be sectors without heat exchangers 901. Sectors without heat exchangers could have turbines exhausting either into the arena 904 via tangential entry ducts 921 or into the under floor plenum 906. In FIGS. 9 and 10, there could be turbines, located in the space between heat exchangers 901, exhausting into the under-floor plenum 906. These turbines could exhaust into the under-floor plenum 906 via radial passageways located under tangential entries 921. There could be sectors without heat exchangers or turbines set aside for possible future vortex engine capacity expansion. Sectors without heat exchanger or turbines could be used to provide access for operation, observation or maintenance.

All figures are drawn for ease of explanation of the basic teachings of the present invention only; the extensions of the Figures with respect to number, position, relationship, and dimensions of the parts to form the preferred embodiment will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood. Where used in the various figures of the drawings, the same numerals designate the same or similar parts. Furthermore, when the terms "top", "bottom", "first", "second", "inside", "outside", "edge", "side", "front", "back", "length", "width", "inner", "outer", and similar terms are used herein, it should be understood that these terms have reference only to the structure shown in the drawings as it would appear to a person viewing the drawings and are utilized only to facilitate describing the invention.

Although the method and apparatus of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

The Abstract of the Disclosure is provided to comply with 37 C.F.R. section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment.

What I claim as my invention is:

1. A thermodynamic engine for producing a vortex comprising:
   (a) a vertical axis cylindrical wall with an upper and a lower end,
   (b) an opening at said upper end,
   (c) a multiplicity of openings at said lower end,
   (d) an arena with a floor within said cylindrical wall,
   (e) means for directing air entering said lower end towards the tangential direction,
   (f) restrictors to control the quantity of air entering said lower end, wherein said means for directing air entering lower end towards the tangential direction comprises linear tangential entry ducts each with an air inlet and an air outlet; wherein said cylindrical wall is polygonal in shape; wherein said linear tangential entry duct is located inside said cylindrical wall; and wherein said linear tangential entry duct abuts one linear side of said cylindrical wall.

2. A thermodynamic engine for producing a vortex comprising:
   (a) a vertical axis cylindrical wall with an upper and a lower end,
   (b) an opening at said upper end,
   (c) a multiplicity of openings at said lower end,
   (d) an arena with a floor within said cylindrical wall,
   (e) means for directing air entering said lower end towards the tangential direction,
   (f) restrictors to control the quantity of air entering said lower end, wherein said means for directing air entering lower end towards the tangential direction comprises linear tangential entry ducts each with an air inlet and an air outlet; further comprising heat exchangers; wherein said heat exchangers each have a cold air inlet and a warm air outlet; and wherein said warm air outlet abuts the outside of said cylindrical wall; and wherein said cylindrical wall has lower end wall openings wherein said heat exchanger warm air outlet and said linear tangential entry duct air inlet are connected through said wall openings.

3. The engine of claim 2, wherein said heat exchanger is a cross-flow wet cooling tower comprising:
   (a) a sub-atmospheric enclosure,
   (b) a warm water distributor tray located within said sub-atmospheric enclosure.

4. The engine of claim 3 further comprising a cooled water outlet; further comprising a water seal on said cooled water outlet to prevent air from entering said sub-atmospheric enclosure through said cooled water outlet.

5. The engine of claim 2, further comprising a plurality of reverse circulation air entries, whereby the net tangential velocity of the air within the arena is controlled by restricting the flow in said tangential entry ducts and not restricting said reverse circulation air entries and vice versa.

6. The engine of claim 1, further comprising an annular ring above said convergence roof, whereby said annular ring reduces downdrafts along the inside of said cylindrical wall.

7. The engine of claim 1, further comprising a circular room under said floor opening wherein there are deflectors around the periphery of said circular room.

8. The thermodynamic engine of claim 1, wherein there are radial air entries in addition to said tangential entry ducts, wherein the mode of operation can be changed from non-vortex radial-entry mode to vortex tangential-entry mode by closing said radial air entries and opening said tangential entry ducts and vice versa.

* * * * *